United States Patent

[11] 3,632,058

| [72] | Inventor | Robert W. Stoffel<br>Ferndale, Mich. |
|------|----------|------------------------------------|
| [21] | Appl. No. | 813,918 |
| [22] | Filed | Apr. 7, 1969 |
| [45] | Patented | Jan. 4, 1972 |
| [73] | Assignee | Jim Robbins Seat Belt Co.<br>Troy, Mich. |

[54] EMERGENCY LOCKING RETRACTOR WITH CAM-CONTROLLED LOCKING MEMBER
9 Claims, 8 Drawing Figs.

[52] U.S. Cl. ................................................ 242/107.4
[51] Int. Cl. ................................................ B65h 75/48
[50] Field of Search ........................... 242/107, 107 SB, 107.4, 107.5, 107.6; 297/388; 280/150 SB

[56] References Cited
UNITED STATES PATENTS

| 3,482,799 | 12/1969 | Wrighton et al. | 242/107.4 |
| 3,341,250 | 9/1967 | Rasmussen | 242/107.4 UX |
| 3,348,789 | 10/1967 | Hirsch | 242/107.4 |
| 3,412,952 | 11/1968 | Wohlert et al. | 242/107.4 |
| 3,450,368 | 6/1969 | Glauser et al. | 242/107.4 |
| 3,467,337 | 9/1969 | Putman | 242/107.4 |

Primary Examiner—Stanley N. Gilreath
Assistant Examiner—Werner H. Schroeder
Attorneys—Marvin Bressler and Jonathan Plaut ABSTRACT: A safety seat belt retractor having means for locking the reel against rotation in the direction in which the belt is extended in response to a predetermined extension rate. The locking means is rendered inoperable whenever the belt if fully retracted, but becomes operable in response to the belt being extended and then partially retracted. This necessary sequence of belt motions obviates prelocking whenever the user extends the belt from its fully retracted condition.

3,632,058

PATENTED JAN 4 1972

INVENTOR
ROBERT W STOFFEL
BY
Hauke Knass Gifford & Patalidis
Attorneys

PATENTED JAN 4 1972

INVENTOR
ROBERT W. STOFFEL

BY
Hauke Knaus Gifford & Patalidis
Attorneys

EMERGENCY LOCKING RETRACTOR WITH CAM-CONTROLLED LOCKING MEMBER

BACKGROUND OF THE INVENTION

This invention relates to emergency locking seat belt retractors and more specifically to such a retractor having a clutch-operated means for locking the reel in response to an abnormal belt extension but which is inoperable until the belt is extended from its fully retracted position and then partially retracted.

Vehicle seat belt retractors are known which have a reel locking mechanism that allows the belt to be coupled to the user without restraining his movements unless the belt is suddenly extended from its reel at an abnormal rate. The locking mechanism responds to the sudden extension by engaging the reel to prevent further belt extension. The belt then restrains the user's motion relative to the vehicle until the locking mechanism is released.

A special problem with those retractors that have a locking mechanism that is intended to respond to a sudden belt motion during an emergency condition is that it is responsive to such a motion even when the belt is not intended to form a restraint. For instance, the locking mechanism often "prelocks" when the user extends the belt from its fully retracted position in order to buckle it around his body. This prelocking is particularly undesirable when it occurs before a significant quantity of belt has been unwound from the reel.

Several approaches have been disclosed in the art for preventing such prelocking. One approach is to provide a sensing member that rides on the belt roll that is wound on the reel. The sensing member is connected to the locking mechanism in such a manner as to prevent the reel from being locked whenever the roll has a certain diameter. The locking mechanism is rendered operable only when the size of the roll has been reduced by the unwinding of a predetermined length of belt.

Another approach has been to provide some form of time delay device that prevents the locking mechanism from being operable for a predetermined period of time after the belt is extended from its fully retracted position.

SUMMARY OF THE INVENTION

The broad purpose of the present invention is to provide an emergency locking seat belt retractor having locking means that is inoperable to lock the reel whenever the belt is fully retracted, and becomes operable only in response to a belt motion in which a minimum length of the belt is extended from the reel and then is slightly retracted. When operable the locking means is responsive only to the reel being rotated by a sudden belt extension. Whenever it is locked, the reel can be unlocked by a partial belt retraction.

The preferred retractor has a belt reel journaled on a support and provided with a pair of ratchets. A pawl, mounted on the support, is movable toward a locking position in which it engages the ratchets to stop reel rotation in the direction in which the belt is unwound. A magnet biases the pawl toward its release position in which it is separated from the ratchets.

A pair of disklike clutch members mounted on the reel control the motion of the pawl. One of the clutch members is formed of plastic and is movable toward a position in which it is frictionally engaged with the reel so as to form a connection to the pawl for moving it toward its locking position as the reel is rotated in the unwinding direction. The motion of the plastic clutch member toward engagement with the reel is controlled by a cam and follower arrangement, and the second clutch member. The cam and follower prevent the plastic clutch from being rotated a sufficient distance to move the locking member, unless the reel has been rotated a certain number of turns in the unwinding direction from a position in which the belt is fully retracted, and then only if the reel is slightly rotated in the winding direction. When released by its connection to the cam and follower, the inertia of the second clutch member is suitably employed to bias the plastic clutch toward frictional engagement with the reel whenever the reel is rotated in the unwinding direction at a predetermined rate.

The preferred retractor provides several advantages over similar emergency locking retractors that are known in the art. It requires a relatively few components that can be assembled in a compact unit. It eliminates the possibility of prelocking regardless of the amount of belt that is extended from the belt's fully retracted position by taking advantage of the natural tendency of seat belt users to initially overextend the belt in order to buckle it, and then to release it so that it partially retracts to the shape of the user's body.

Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
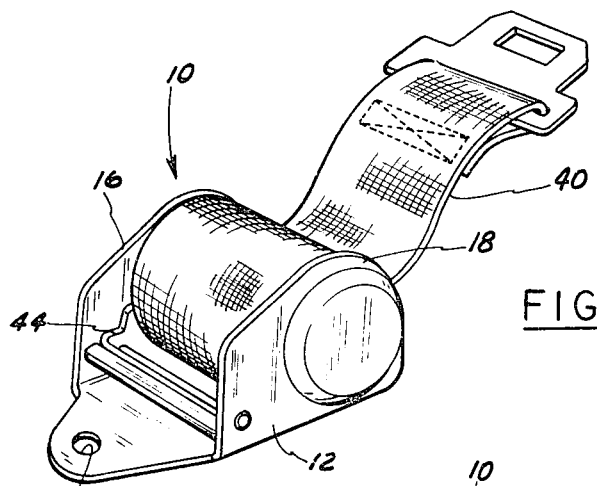
FIG. 1 is a perspective view showing an emergency locking seat belt retractor illustrating the preferred embodiment of the invention.
Figure 2:
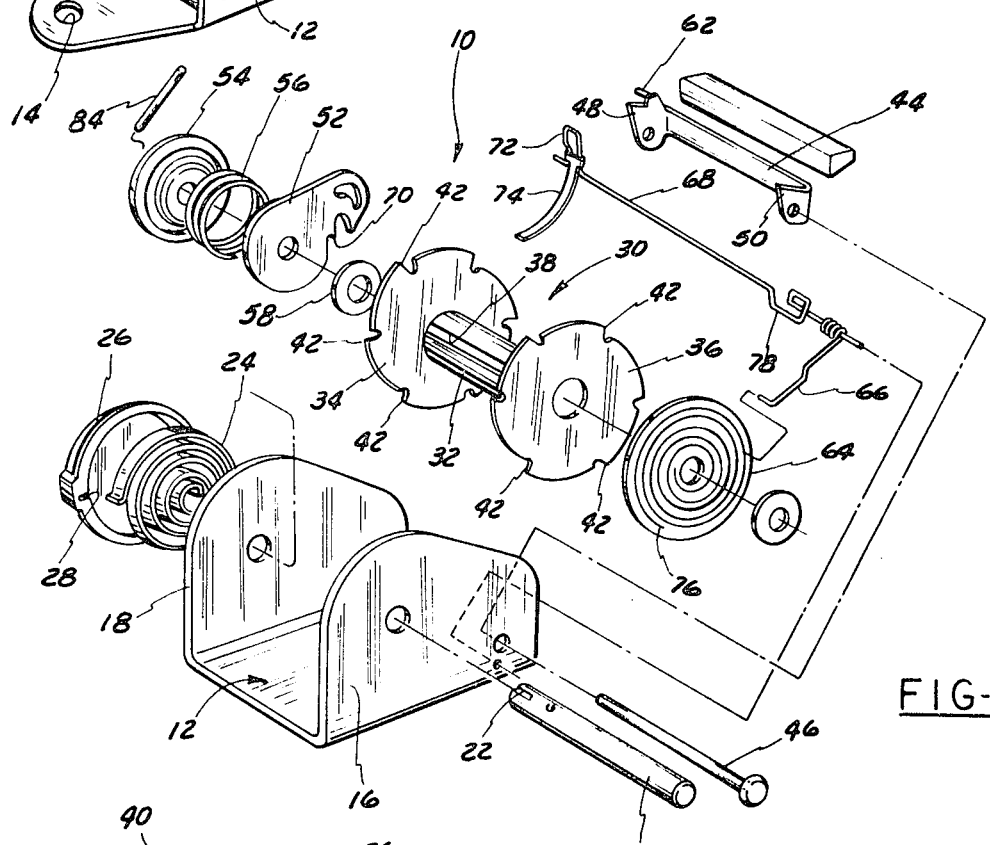
FIG. 2 is an exploded view of the retractor of FIG. 1.

Now referring to FIGS. 1 and 2, a preferred seat belt retractor 10 comprises a generally channel-shaped support 12 having a base formed with an aperture 14 for attaching the support to a vehicle. The support 12 also have a pair of upstanding sidewalls 16 and 18.

A shaft 20 is journaled on the sidewalls 16 and 18. One end of the shaft 20 has a slot 22 connected to the inner end of a spiral windup spring 24. The windup string 24 is mounted adjacent the sidewall 18. A housing 26 mounted on the sidewall 18 encloses the spring 24 and has a recess 28 connected to the outer end of the spring in such a manner that as the shaft 20 is rotated in an unwinding direction, the spring becomes tensioned to bias a shaft in the opposite, winding direction.

Figure 3:
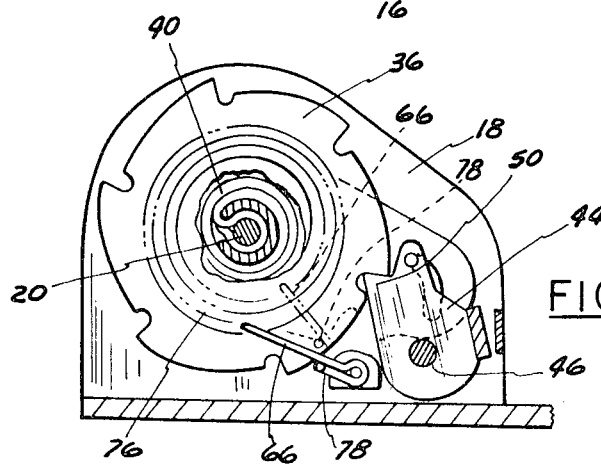
FIG. 3 is an elevational sectional view showing the pawl in its locking position.
Figure 4:
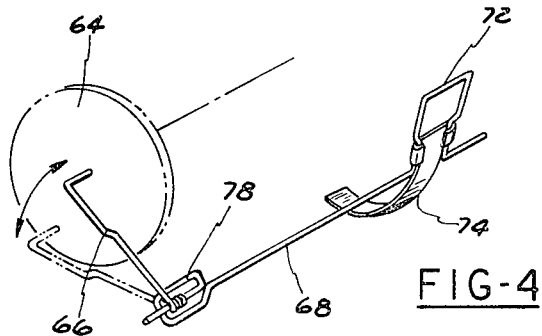
FIG. 4 is a view showing the cam, the follower and the stop for controlling the motion of one of the clutch members.

A reel generally indicated at 30, is mounted on the shaft 20 between the sidewalls 16 and 18. The reel 30 is formed of a metal cylinder 32 which has its ends supported by a pair of metal circular ratchets 34 and 36 that are mounted on the shaft 20. The reel 30 is fixed to shaft 20 so that they rotate together. The cylinder 32 has a slot 38 extending between the ratchets 34 and 36 for receiving the inner end of a seat belt 40. As best illustrated in FIG. 3, the belt 40 is connected to the reel 30 by having its inner end inserted into the slot 38, around the shaft 20, and then out through the slot to a portion where it is stitched to itself to form a permanent loop.

The two ratchets 34 and 36 each have an annular series of teeth 42. A pawl 44 is pivotally mounted on the sidewalls 16 and 18 by pin 46 in such a manner that a pair of pawl teeth 48 and 50 are movable toward respective locking positions with the teeth of the ratchets 34 and 36. When engaged with the teeth of the ratchets, the pawl prevents rotation of the reel in its unwinding direction. The pawl is movable away from the ratchets toward a release position in which the reel 30 can be rotated in either its winding or unwind direction.

A pair of disk-shaped clutch members 52 and 54 are mounted on the shaft 20 between the ratchet 34 and the sidewall 18. A coil spring 56 is disposed between the two clutch members to bias them away from one another and a friction element 58 is disposed between the clutch member 52 and the ratchet 34.

Figure 5:
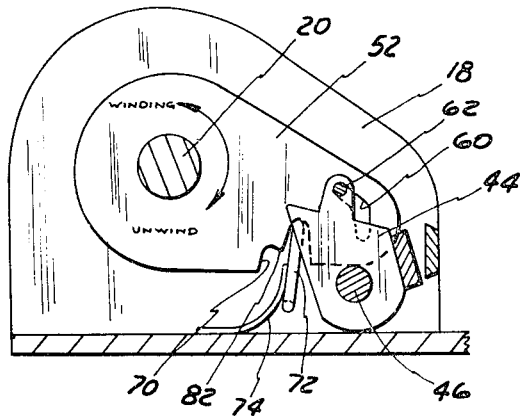
FIG. 5 is another view showing the pawl in its locking position.
Figure 6:
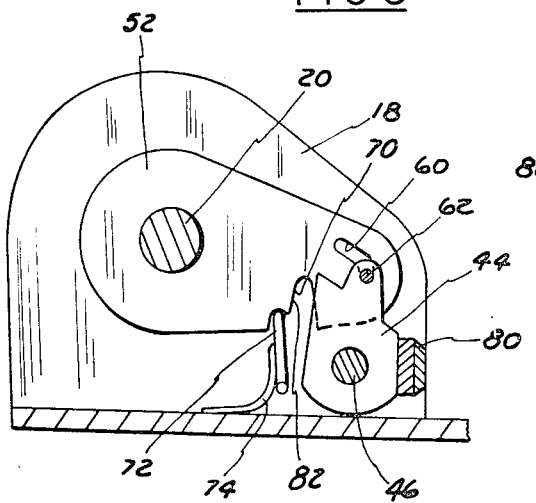
FIG. 6 is a view similar to FIG. 5, but showing the pawl in its release position.

As best illustrated in FIGS. 5 and 6, the clutch member 52 has a slot 60 in which is received a pin 62 carried by the pawl 44 such that as the clutch member 52 is rotated in the winding direction, it biases the pawl toward its release position, and as the clutch is rotated in the opposite, unwinding direction it biases the pawl toward its locking position.

Rotation of the clutch member 52 between the ends of the slot 60 is partially controlled by a cam 64 mounted on the ratchet 36, a follower 66 which is engaged with the cam and a stop 68 which connects the follower 66 and the clutch member 52. The stop 68 is formed of a section of relatively stiff wire having its ends journaled in the sidewalls 16 and 18 of the support. The clutch member 52 has a cutout portion 70 engaged with an arm 72 of the stop.

The stop 68 is pivotal between a holdout position illustrated in FIG. 6 in which the arm 72 prevents the clutch member 52 from being moved in the unwind direction, and a release position illustrated in FIG. 5, in which it allows the clutch member 52 to be moved in either the winding or unwind direction. In its holdout position, the stop prevents the clutch member 52 from moving the locking pawl from its release position toward its locking position. A leaf spring 74 biases the stop arm 72 toward its release position.

Referring to FIGS. 2 and 3, the outer end of the follower 66 is engaged in a spiral track 76 which is formed in the surface of cam 64 around the reel's axis of rotation. The spiral track 76 has a greater number of revolutions between its inner and outer ends than are necessary to rotate the reel between its positions in which the belt 40 is fully extended and fully retracted. Thus the follower never abuts either end of the track.

The inner end of the follower is wrapped around the stop 68 so as to be pivotal with respect to the stop. The follower extends through a loop 78 in the stop in such a manner that when the follower is in its lower position, as viewed in FIG. 3, it abuts the loop 78 to prevent the stop from being pivoted clockwise. It thereby prevents the stop arm 72 from being moved from its holdout position toward its release position. As the cam is rotated to pivot the follower 66 clockwise, it becomes separated from the loop 78 until the stop is free to be pivoted towards its release position.

Now referring to FIGS. 3, 5 and 6, assuming the belt has just been fully retracted, the pawl 44 would be in its release position toward which it is biased by a magnet 80. The clutch member 52 would be in its counterclockwise position as illustrated in FIG. 6, the stop arm 72 would be in its holdout position, and the follower 66 and the loop 78 would be in the positions illustrated in solid lines in FIG. 3. In this fully retracted position, the clutch member 52 cannot be rotated with the reel as the belt 40 is initially extended, therefore the clutch member 52 prevents the pawl from being moved toward its locking position.

As the belt 40 is initially extended from its fully retracted position, the reel 30 and the cam 64 are rotated in the unwind direction to pivot the follower 66 clockwise toward its position illustrated in phantom in which it is separated from the loop 78. The stop 68 is thus free to be pivoted from its holdout position toward its release position, however, it is retained in its holdout position by a projection 82 in the cutout portion of the clutch member 52 until it is rotated slightly in the winding direction. Thus it can be seen that when the stop arm 72 is in its holdout position, the clutch member 52 is not free to move the locking pawl 44 toward its locking position until the occurrence of two events. First, the reel 30 must be rotated in the unwind direction a predetermined rotational interval from its position in which the belt 40 is fully retracted for the follower to be moved to a position in which it allows the stop to be pivoted toward its release position. The cam track 72 is formed so that about 10 to 12 inches of the belt must be extended in order to rotate the cam through the necessary rotational interval for the stop to have sufficient freedom of motion to its release position.

Secondly, the belt 40 must be partially retracted so that the frictional engagement between the clutch member 52 and the ratchet 34 together with the bias of spring 74 can move the stop arm 72 toward its release position. In this position, the stop arm 72 is inoperable to prevent the clutch member 52 from moving the pawl toward its locking position.

Assuming the belt has been fully extended and then is to be retracted, the reel's initial rotation in its winding direction rotates clutch member 52 in its counterclockwise direction. Continued reel rotation causes the cam 64 to move the follower in its counterclockwise direction until it engages the loop 78 to pivot the stop arm 72 toward its holdout position. When the belt is fully retracted, a slight reel rotation in the unwind direction will cause the projection 82 of the clutch member to trap the stop arm in its holdout position.

Figure 7:
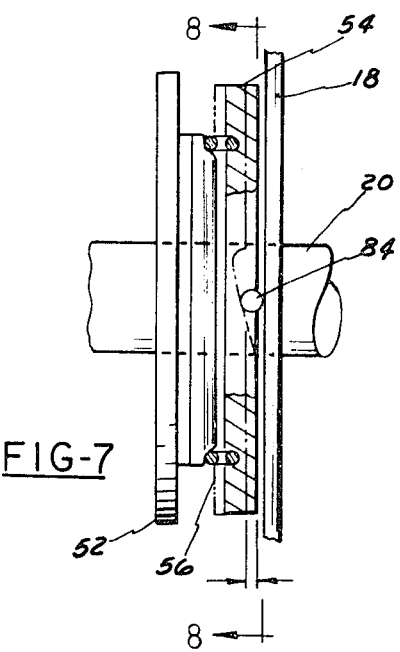
FIG. 7 is an enlarged view showing the manner in which the clutch members cooperate in response to an abnormal reel rotation.
Figure 8:
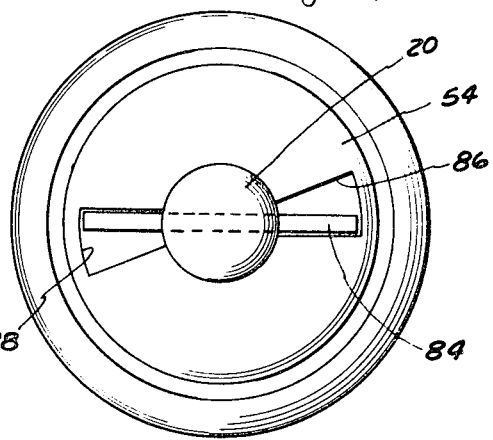
FIG. 8 is a view taken along lines 8–8 of FIG. 7.

Now referring to FIG. 7 and 8, a pin 84 is carried by the shaft 20 between the support sidewall 18 and the clutch member 54. The pin 84 is mounted transversely of the shaft's rotation with its ends in contact with a pair of cam surfaces 86 and 88 formed in clutch member 54. The cam surfaces 86 and 88 are formed in such a manner that as the shaft 20 is rotated in the winding direction, the pin 84 forms a connection between the shaft and the clutch member 54. However, when the shaft 20 is rotated in the unwind direction, the pin 84 biases the clutch member 54 toward the clutch member 52. In response to a predetermined rotational acceleration of the shaft 20 in the unwind direction, the bias on the clutch member 52 is such that the clutch member 52 is rotated by the ratchet to move the pawl 44 toward its locking position. In the absence of the bias of the clutch member 54, the clutch member 52 cannot develop frictional engagement with the ratchet 34 to move the pawl 44 toward its locking position.

The clutch member 52 is preferably formed of a lightweight plastic such as nylon. The clutch member 54 is formed of steel with a predetermined mass to function as an inertia member. As can be seen in FIGS. 7 and 8, as the shaft 20 is rotated in the winding direction, the pin 84 drives the clutch member 54 so that it is rotated with the shaft. However as the shaft is rotated in its unwind direction, the inertial mass of clutch member 54 causes it to tend to lag the shaft's rotation. Thus the rotational rate that is necessary for the clutch member 54 to bias clutch member 52 with a sufficient force to form a driving connection between the ratchet 34 and the pawl 44 depends on the mass of clutch member 54 and the bias of spring 56.

It is to be understood that normally the clutch member 54 rotates with the shaft 20 and is disengaged from the clutch member 52, which is then inoperable to move the locking member toward its locking position. Thus the user can perform body motions that require the belt to be freely extended and retracted even though he is buckled within the belt.

Whenever the locking pawl is in its locking position, a partial retraction of the belt will separate the clutch member 52 and 54 and move the locking pawl toward its release position.

It is to be understood that I have described in detail a seat belt retractor having an emergency locking mechaniam that is inoperable whenever the belt is substantially fully retracted, and becomes operable only in response to the belt being extended and then partially retracted. Therefore the reel cannot be "prelocked" as the user initially extends the belt from its fully retracted position. In addition, when operable, the locking mechanism is responsive only to an abnormal reel rotational rate as produced by a sudden increase in the rate of belt extension during a collision or the like when various inertia forces tend to suddenly displace the belt user from his seated position in the vehicle.

Having described my invention, I claim:

1. In a safety seat belt system, the combination comprising:
  a. a support;

b. a reel adapted for connection to a seat belt and journaled on the support for rotation in a winding direction and in the opposite, unwind direction;

c. a bias member connected to the reel to urge it to rotate in its winding direction toward the fully wound position;

d. a locking member mounted on the support so as to be movable between the locking position in which it is operable to stop rotation of the reel in its unwind direction, and a release position in which it is inoperable to stop reel rotation;

e. a clutch member mounted on the support for automatically connecting the reel to the locking member to move it toward its locking position in response to the reel being rotated in the unwind direction with an acceleration greater than a predetermined acceleration, the clutch member being inoperable for such a response during any reel rotation which commences from the fully wound position;

f. a cam mounted on said reel;

g. a follower engaged in said cam;

h. a stop connected to said follower; and i. a stop arm connected to said stop and to said clutch member, said stop arm moving in a cutout portion of said clutch member provided with a projection, said projection preventing said stop arm from moving said clutch member, which moves said locking member to its locking position during unwinding, until said clutch member is rotated slightly in the winding direction whereby said clutch member is operable for said response.

2. The combination as defined in claim 1, in which the clutch member is so connected to the locking member as to be inoperable for such a response unless the reel has been rotated beyond a predetermined rotational interval in the unwind direction from said predetermined rotational position.

3. The combination as defined in claim 1, including an inertia member mounted on the reel so as to be moved in a particular motion as the reel is rotated in its predetermined rotation, and wherein the clutch member forms a frictional connection between the reel and the locking member as the inertia member is moved in said particular motion.

4. The combination as defined in claim 1, including a magnet mounted on the support for biasing the locking member toward its release position.

5. The combination as defined in claim 1, including a belt connected to a reel so as to be in a fully retracted position when the reel is in said predetermined rotational position, and to be in a partially extended position when the reel has been rotated in the unwind direction through said predetermined rotational interval.

6. A retracting reel assembly comprising: support means; reel means rotatably supported by said support means; an elongated flexible element connected to said reel means and adapted to be wound thereon and unwound therefrom; locking means movable locked and unlocked positions for respectively preventing and allowing rotation of said reel means; clutch means for moving said locking means to said locked position in response to a predetermined rotational acceleration of said reel means in the unwind direction; and means provided on said clutch means for prevention said locking means from moving into said locking position without rotation in said winding direction.

7. An assembly as set forth in claim 6 wherein said clutch means is provided with means for maintaining said locking means in said unlocked position during continuous unwinding rotation of said reel means from the fully wound position.

8. An assembly as set forth in claim 7 wherein said clutch means is supported for rotation about the axis of rotation of said reel means, and further including inertia means coaxial with said reel means for rendering said clutch means responsive to rotation of said reel means upon said predetermined rotational acceleration of said reel means.

9. A retracting reel assembly comprising:

a support means comprising a generally U-shaped bracket having a base and parallel sidewalls;

reel means, rotatably supported by said support means, including a shaft extending between said sidewalls, a cylinder concentrically disposed about said shaft, a circular platelike ratchet member secured to each end of said cylinder, said ratchet members being supported by said shaft for rotation relative to said bracket, said cylinder having a slot extending therealong, an elongated flexible element comprising a seat belt being connected to said shaft and extending through said slot to be wound and unwound about said cylinder, and biasing means for urging said ratchet members and said cylinder to rotate in the winding direction;

locking means movable between locked and unlocked positions for respectively preventing and allowing rotation of said reel means, said locking means including a pawl supported by and extending between said walls; and control means for moving said locking means to said locked position in response to a predetermined rotational acceleration of said reel means in the unwind direction but only after unwinding rotation commencing from the fully wound position followed by rotation in the winding position, said control means including clutch means a comprising a clutch plate rotatably supported on said shaft, a friction member disposed about said shaft, and means biasing said clutch plate and said friction member together, and clutch plate being operatively connected to said locking pawl through an extension of said locking pawl and a slot in said clutch plate.

* * * * *

PO-1050
(5/69)

UNITED STATES PATENT OFFICE
CERTIFICATE OF CORRECTION

Patent No. 3,632,058            Dated January 4, 1972

Inventor(s) ROBERT W. STOFFEL

It is certified that error appears in the above-identified patent and that said Letters Patent are hereby corrected as shown below:

IN THE SPECIFICATION

Column 2, line 48, "string" should be -- spring --.

Column 2, line 64, "portion" should be -- position --.

Column 4, line 59, "member" should be -- members --.

Column 4, line 62, "mechaniam" should be -- mechanism --.

IN THE CLAIMS

Column 6, claim 6, line 8, "prevention" should be
      -- preventing --.

Column 6, claim 9, line 45, delete "a".

Column 6, claim 9, line 49, "and" should be -- said --.

Signed and sealed this 6th day of June 1972.

(SEAL)
Attest:

EDWARD M. FLETCHER, JR.          ROBERT GOTTSCHALK
Attesting Officer               Commissioner of Patents